Aug. 19, 1952   L. R. BUCKENDALE   2,607,431
VEHICLE WITH MEANS FOR LATERALLY STABILIZING TANDEM DRIVE AXLES
AND TRANSMITTING BRAKE AND DRIVE TORQUE REACTIONS TO THE FRAME
Filed Feb. 4, 1946   3 Sheets-Sheet 1
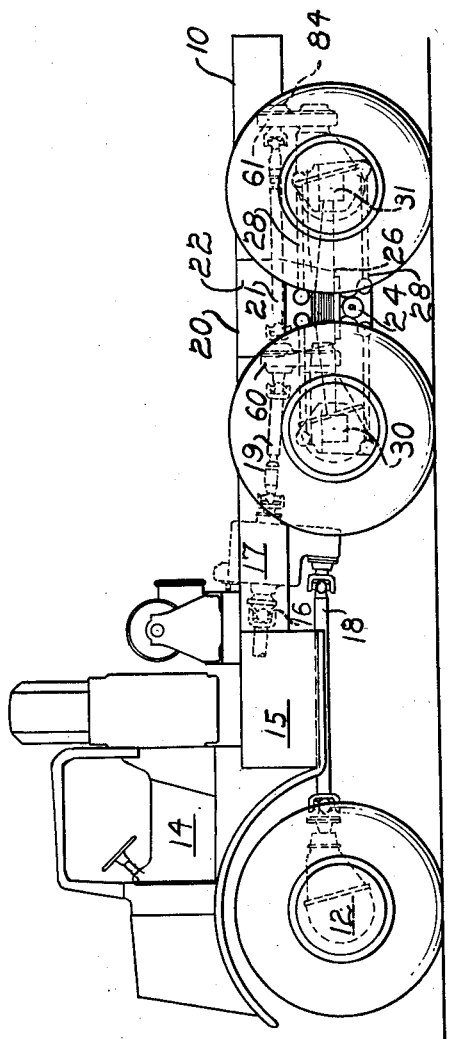
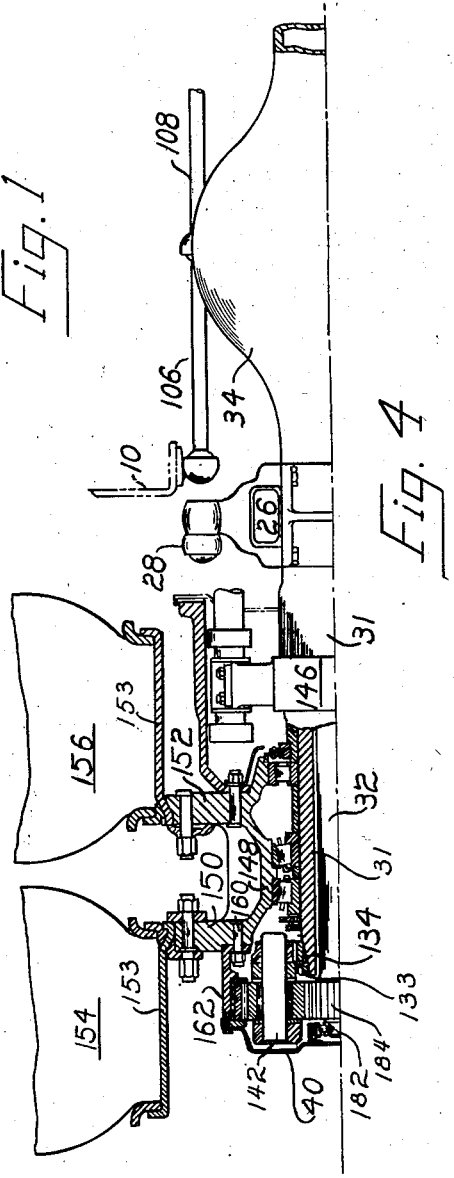
Lawrence R. Buckendale
INVENTOR
BY Strauch + Hoffman
ATTORNEYS

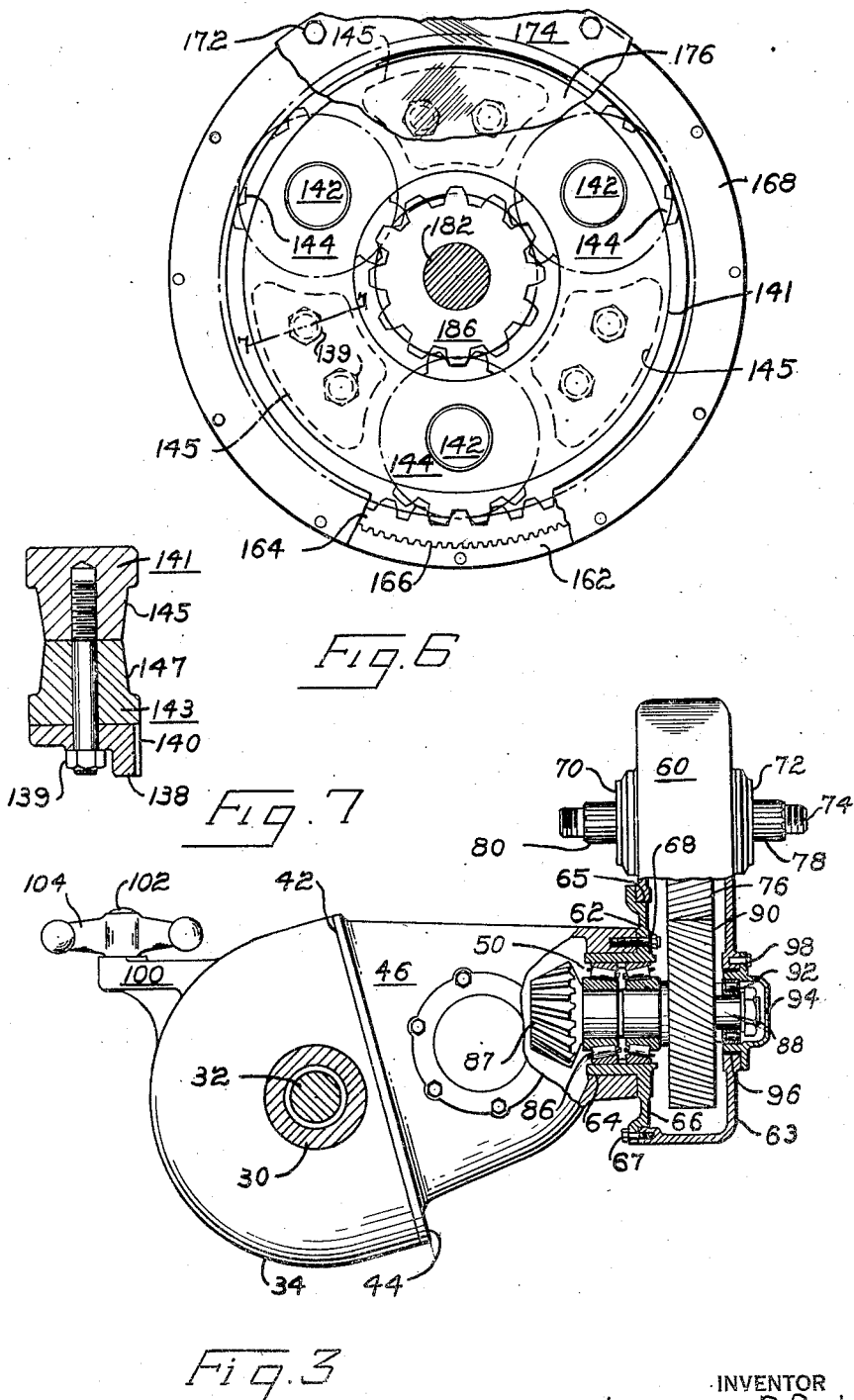

Patented Aug. 19, 1952

2,607,431

UNITED STATES PATENT OFFICE 2,607,431

VEHICLE WITH MEANS FOR LATERALLY STABILIZING TANDEM DRIVE AXLES AND TRANSMITTING BRAKE AND DRIVE TORQUE REACTIONS TO THE FRAME

Lawrence R. Buckendale, Detroit, Mich., assignor to The Timken-Detroit Axle Company, Detroit, Mich., a corporation of Ohio Application February 4, 1946, Serial No. 645,334

4 Claims. (Cl. 180—22)

This invention relates to motor vehicle drive axles and axle assemblies and more particularly to an improved tandem axle assembly for short coupled vehicles and improved drive axle construction.

The major object and purpose of the present invention is to provide certain important improvements which will reliably function to increase the stability and general operating efficiency of a tandem axle assembly of the type disclosed in the Buckendale Patent No. 1,946,060, issued February 6, 1934, when used in a short coupled vehicle such as a cab over engine tractor.

It is of major importance in vehicles employing such tandem axle units to obtain maximum pay load capacity with minimum overall length of the vehicle. Usually the load is supported by conventional leaf springs centrally pivoted on a transverse frame bolster and having their opposite ends flexibly connected with the respective housings for the front and rear axles of the tandem unit upon which the vehicle load is equally distributed. Owing to the increase in pay load capacity in vehicles of this type it has been found necessary to materially increase torque output and to provide stabilizing means for the tandem axle unit. For the latter purpose, cross connections are provided between the axle housing and opposite sides of the vehicle frame which serve to neutralize the effect of excessive lateral stresses while retaining overall flexibility.

Further, since it is not permissible to increase the overall length of a short coupled vehicle such as a cab over engine tractor vehicle in proportion to the increase in load capacity, it is necessary to provide a tandem axle unit for such a short coupled vehicle which will satisfy the above requirements and yet retain sufficient propeller shaft length to prevent high angularity with its accompanying destructive stresses in the universal joint connections. This problem is especially difficult where large double reduction drive axles are incorporated in the unit. By means of the invention to be presently described, I have succeeded in solving these several problems.

From the above it will be understood that it is one of the principal objects of this invention to provide a tandem axle assembly and drive means therefor which is practically adaptable for use in short coupled, large capacity heavy duty vehicles.

It is a more particular object of this invention to provide a tandem axle assembly for vehicles of the above type together with improved drive means for transmitting and uniformly distributing the torque load to the several vehicle wheels and embodying multiple reduction gear assemblies so located and arranged that the overall length of the vehicle in which my novel tandem axle unit is incorporated will not be increased.

Another object of the invention is to provide an improved assembly of the differential gear carrier and power transfer reduction unit for each of the axles.

A further object of the invention resides in the provision of a very simply constructed planetary gear reduction at the wheel ends of the axles which may be easily and quickly assembled or disassembled.

It is another detail object of the invention to provide a simple and novel mounting for the planetary pinion carrier so that it may have limited radial floating movement between the sun gear on the axle shaft and the planetary orbit gear, in order to avoid destructive localized tooth stresses.

A still further object of this invention is to provide each axle shaft at its outer end with a sun gear and means to resiliently journal the shaft end and yieldingly center the sun gear with respect to the planetary pinions.

With the above and other subordinate objects in view, the invention comprises the improved tandem axle assembly and double reduction drive therefor, as will hereinafter be more fully described, illustrated in the accompanying drawings and subsequently incorporated in the subjoined claims.

In the drawings wherein similar reference characters designate corresponding parts throughout the several views:

Figure 1 is a side elevation of a motor vehicle provided with one practical embodiment of my improved tandem axle unit;

Figure 3 is a side elevation partly in section illustrating the adapter means for assembling the differential drive shaft and power transfer reduction gearing on the differential carrier;

Figure 4 is a fragmentary rear elevation of one of the axle housings taken on the line 4—4 of Fig. 2, partly in section and illustrating the planetary gear reduction mechanism between one of the axle shafts and one of the dual tired road wheels;

Figure 6 is an end elevation of the axle of Figure 5, with certain parts broken away and in section; and Figure 7 is a detail horizontal sectional view taken substantially on the lines 7—7 of Figure 6.

Figures 2, 5:
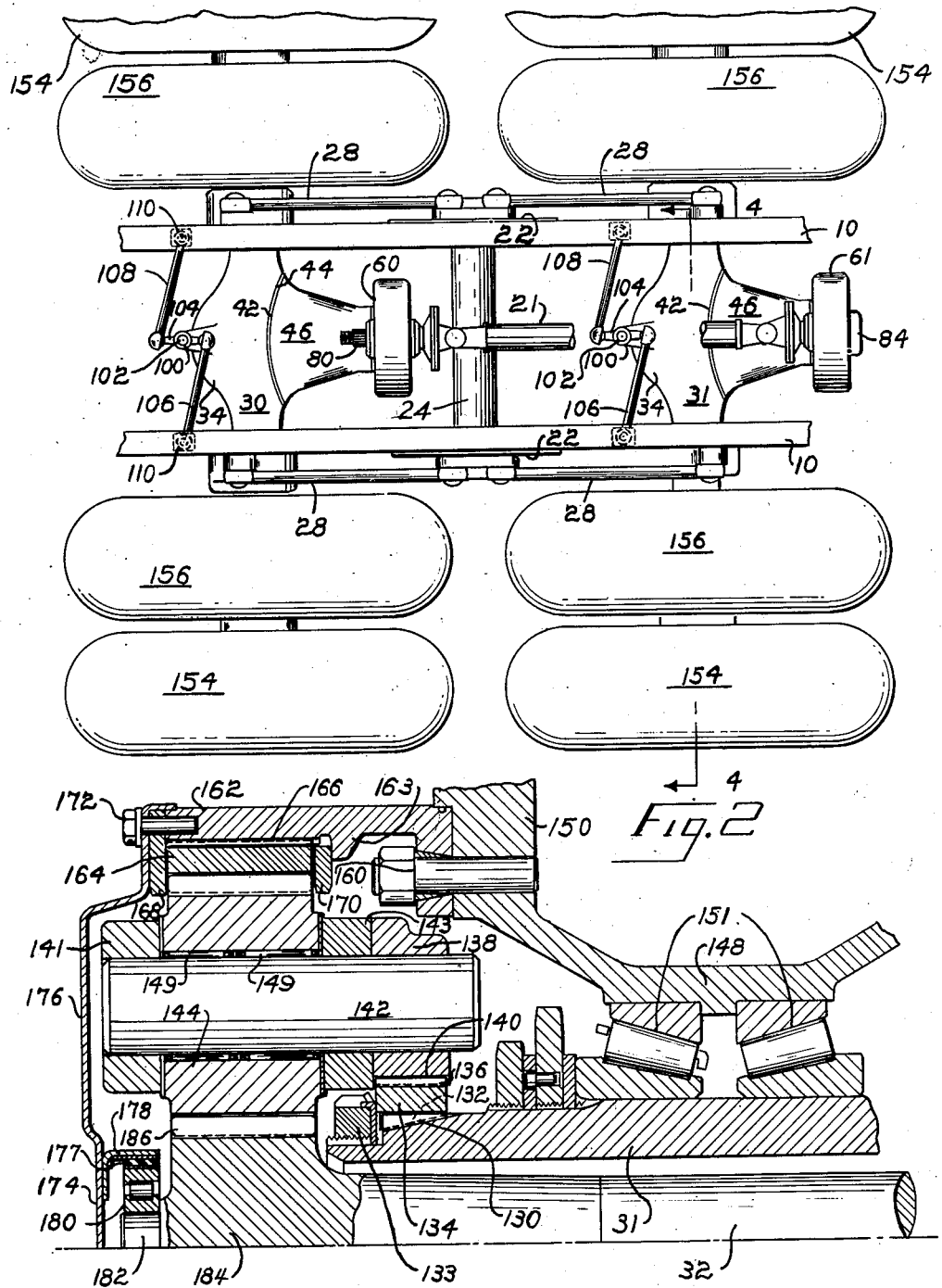
Figure 2 is a plan view of the axle unit illustrating the general arrangement of the differential carriers and the associated power transfer units and the lateral stabilizing connections between the vehicle frame and the axle housings.
Figure 5 is a detailed sectional view on an enlarged scale of the planetary reduction gearing shown in Figure 4.

With further detailed reference to the drawings, the side rails 10 of the vehicle frame are provided at their forward ends with any improved mounting means for the motor or engine (not shown). This end of the vehicle frame is also suspended by conventional means upon the front driven axle 12. The operator's cab 14 is located directly above the engine while 15 designates the main transmission and 17 an auxiliary transmission suitably mounted in the frame through which the power is transmitted from the engine to the axle shafts of the tandem axle assembly, generally indicated at 20.

The frame rails 10 are of the usual channel form having their webs vertically disposed and upper and lower flanges extending inwardly therefrom. To each of these rails a depending bracket 22 is riveted or otherwise rigidly secured. Below the frame rails, the opposite ends of a transverse frame bolster 24 are secured in the brackets 22 and upon the ends of this bolster longitudinally extending laminated leaf springs 26 are suitably pivoted intermediate of their ends. The opposite ends of these body suspension springs are flexibly connected respectively to the front and rear tandem axle housings 30 and 31. Each of these housings, at each side of its central portion is also connected with the brackets 22 by means of the longitudinally extending upper and lower parallel torque rods 28. The construction of the tandem axle unit and its parallelogram torquing arrangements as thus far described are substantially the same as that shown in the above identified Buckendale patent.

Each of the axles includes co-axial axle shafts one of which is indicated at 32 in Figures 3, 4 and 5, said shafts being operatively connected by conventional differential gearing. The differentials are disposed within the enlarged central sections 34 of the housings 30 and 31 and are preferably interchangeable. Each axle at its outer end is provided with planetary reduction gearing for transmitting the driving torque to the individual vehicle wheels. These planetary reductions, generally indicated at 40, will be hereinafter more fully described.

The enlarged center section 34 of each axle housing is provided at the rear side thereof with a differential receiving opening 42 provided with a locating face for the attaching flange 44 of a differential mechanism carrier 46 which may be rigidly secured to the housing by the conventional studs or other means. Preferably, the locating face of opening 42 is disposed at a vertically oblique inclination, as seen in Figure 3 of the drawing.

The differential mechanism carriers 46 project rearwardly from the respective axle housings and upon the rear end of each carrier a transfer gear case is assembled. Since these transfer gear cases, generally indicated at 60 and 61 respectively in Figure 1, are of identical construction, the following detail description of one will suffice for both.

As clearly shown in Figure 3 of the drawings, the differential mechanism carrier 46 is provided at its rear end with the opening 50 to receive a cylindrical bearing receiving cage 64 integrally formed with the adapter member 62 having a large diameter flange 66 abutting the end of the carrier 46 and rigidly secured thereto by means of the bolts 68. The housing structure 63 of the transfer gear case is provided in its front wall with an opening 65 covered by adapter member 66 to which it is rigidly secured by the stud bolts 67. The transfer case housing 63 extends vertically above the differential carrier 46 and, above the level of the axle housing, the opposite lateral walls thereof are provided with suitable bearings indicated at 70 and 72, in which a shaft 74 is journalled. Within the housing 63, a gear 76 is splined or otherwise secured to the shaft 74. The opposite ends of each shaft 74 are splined as shown at 78 and 80 to receive universal joint connections between the two transfer units and the auxiliary propeller shaft 21 and between transfer unit 60 and the propeller shaft 19 connected with the output shaft of the auxiliary transmission 17. The rear end of shaft 74 of the transfer unit 61 may be capped as indicated at 84 in Figure 1.

Suitable bearings 86 are mounted in the cylindrical cage portion 64 of the adapter member 62, in which a shaft 88 for differential drive pinion 87 is journalled. Within the housing 63, a gear 90 is keyed or otherwise secured to shaft 88 and is in constant mesh with gear 76. Gear 90 is larger than gear 76 so as to provide a first drive speed reduction. The second speed reduction is provided between gear 87 and the differential ring gear (not shown). The rear wall of housing 63 is provided with opening 96 to receive a cage member 94 which also serves as a closure for said opening and is provided with an attaching flange secured to the housing wall by screws or studs 98. This cage member carries bearing 92 in which the rear end of the pinion shaft 88 is journalled. It will be noted that the cage member 94 is in clearance relation to the wall of opening 96 and is secured in place solely by means of the screws or bolts 98. This insures a proper alignment of the bearings 86 and 92 and obviates a possible eccentric relation thereof due to the mounting of the gear housing upon the adapter member 62. Propeller shafts 19 and 21 and shafts 74 and 88 all have their axes in a common vertical plane on the horizontal centerline of the vehicle in the preferred embodiment.

The central portion 34 of each axle housing is provided at the forward side thereof with a boss 100 located substantially on the vehicle center line. In this boss, a vertical pivot pin 102 is suitably fixed and has a lever 104 journalled thereon intermediate of its ends. To each end of this lever, the inner end of a transverse rod 106 and 108 respectively is universally pivoted. The outer end of each rod is similarly universally pivoted as indicated at 110 to one of the vehicle frame side rails 10. With this arrangement, when the vehicle frame 10 shifts laterally with respect to the axles, the reaction of one of the rods 106 or 108 which is in compression tends, through the equalizing lever 104, to neutralize the reaction of the other rod. By the provision of the universal connection between these rods and each axle housing, the vehicle frame may have a transverse tilting or rocking motion, one side thereof rising while the other side lowers, without imposing undue stress upon the stabilizer assembly. Also of course, the frame, when disposed in the horizontal plane, may freely rise and fall in the reaction of the load suspension springs.

As above noted, in addition to the transmission of driving torque from the motor to the axle shafts at reduced speeds through the transfer gear units 60 and 61, I also provide an additional final planetary reduction drive between the outer ends of the respective axle shafts and the vehicle wheels associated therewith. This planetary reduction will now be more particularly described with reference to Figures 4–7 of the drawings.

Each axle housing is provided at its opposite ends with external tapered splines 130 engaged by internal splines 132 on a mounting ring 134 for the planetary pinion carrier. Ring 134 is forced onto splines 130 and secured against outward axial movement with respect to the housing by means of the lock nut assembly 133 threaded upon the end of the housing. Ring 134 is also provided with external teeth or splines 136 engaged by mating internal splines 140 provided upon one annular side of member 138 of the planetary pinion carrier. There is sufficient clearance between the mating teeth 136 and 140 to permit a slight radial floating movement of the planetary pinion carrier with respect to the ring 134 and the axle housing, while effectively preventing rotative movement of the carrier relative to said ring.

The planetary pinion carrier also includes spacing rings 141 and 143 which are provided with circumferentially spaced apertured bosses 145 and 147 held in abutting contact by the connecting bolts 139, as shown in Figure 7, and thereby spacing said rings apart. These rings and the side member 138 are provided with registering apertures, in which the pinion shafts 142 have a driving fit or are secured by other conventional means, it being noted that ring 143 is in abutting engagement with the side face of the adjacent carrier member 138.

On each of the shafts 142, a planetary pinion 144 is journalled for free rotation between the rings 141 and 143 on the needle bearings indicated at 149.

On the axle housing between the ring 134 and brake mechanism indicated at 146, a dual tired wheel hub 148 is journalled by means of bearings 151. This hub is provided with spaced radially extending flanges 150 and 152 respectively carrying the rims 153 upon which the wheel tires 154 and 156 are mounted in the usual manner. To the outer side of hub flange 150 a cylindrical housing wall 162 for the planetary gearing is secured by means of suitable bolts and nuts indicated at 160. This housing wall rigidly carries an internal annular orbit gear 164 which may be secured thereto by mating pressed fit, splines on said gear and housing wall, indicated at 166 or in any other desired manner. Between the inner end of the orbit gear 164 and an internal annular shoulder 163 on the housing wall 162 is interposed an annular spacer plate 170. A similar annular spacer plate 168 of somewhat greater width extends over the outer end of the orbit gear 164 and is secured, together with a flexible sheet metal hub cap 174, to the housing wall 162 by means of cap screws indicated at 172. Annular plates 168 and 170 overlap the orbit and planetary gears to prevent relative axial movement between the planetary pinions and the orbit gear and maintain the teeth of said gear and pinions in full tooth contact. Preferably, the hub cap 174 is provided with an outer annular channel section 176 receiving the ring 141 of the pinion carrier and which renders the wall of the hub cap somewhat resiliently yieldable in the radial direction.

The outer end of each axle shaft 32 has a sun gear 184 integrally formed therewith and provided with spur gear teeth 186 in constant mesh with the teeth of the planetary pinions 144. Beyond the sun gear, the axle shaft terminates in a diametrically reduced portion 182 journalled in a bearing 180 resiliently supported in cage member 178 by means of the interposed annular cushion of rubber or other resilient material indicated at 177. The cage member 178 is welded or otherwise rigidly secured to the inner face of the hub cap 174.

It will be evident from the above description that in the transmission of heavy drive torque from the axle shafts to the wheels slight radial movement of the sun gear is permissible, and by the resilient mounting of the shaft end bearing 180 together with the radially resilient hub cap and the floating mounting of the pinion carrier, the proper centered relation between the sun gear and the planetary pinions will be attained and maintained to insure an equal distribution of the torque load between said pinions and avoid destructive localized tooth pressures.

From the foregoing description, the operation of the present invention may be readily understood. Thus, the driving force of the engine is delivered through primary transmission 15 and the short coupled propeller shaft 16 to the auxiliary transmission 17. Here the power is divided, propeller shaft 18 delivering torque to the front axles 12 while propeller shaft 19 delivers torque to the transfer gear case 60. Here the torque is transmitted in a first speed reduction to the axle driving differential in housing 30. From shaft 74 of the transfer case 60, torque is also delivered through propeller shaft 21 to transfer case 61 and transmitted at reduced speed to the axle shaft driving differential in the housing 31. From the axle shafts 32, the driving torque is finally transmitted at a further speed reduction to the respective vehicle wheels through the planetary driving gear units 40.

It will be appreciated that the present invention provides a tandem axle assembly and drive mechanism of short coupled heavy duty vehicles of high load capacity in which maximum flexibility, and minimum overall length of the vehicle is obtained. At the same time there is sufficient propeller shaft length to obviate the development of destructive stresses in the shaft connection in the relative vertical movement of the axle unit and the vehicle frame. In the unloaded condition of the vehicle, the propeller shaft 21 is longitudinally parallel with the vehicle frame while the propeller shaft 19 extends upwardly at a very slight inclination from the transfer gear case 60 to the auxiliary transmission 17. By the provision of the adaptor members 62 for the power transfer gear units 60 and 61, the latter may quickly be assembled with the differential gear carriers or dismounted for changing the gear ratio or other purposes. Also the several parts of the invention are of simple structural form and combined in a highly compact organization to provide an efficiently functioning tandem axle assembly and double reduction drive of this type.

In my novel vehicle the tandem axles are disposed far forwardly so as to obtain a short wheel base tractor or like vehicle, but I am enabled to use a long propeller shaft with consequent low universal joint angularity particularly by reason of the rearwardly projecting disposition of carriers 46 on the tandem axles thereby also permitting the advantages of high torque and double reduction drive without demanding additional space.

Thus the drive enters each tandem axle from the rear, or just opposite to the conventional arrangements. To my knowledge this is the first time such a novel arrangement has been incorporated into a tandem axle vehicle.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an automotive vehicle, a frame, a dirigible front axle supporting the front end of the frame, a tendem drive axle assembly comprising two closely spaced drive axles beneath a rearwardly spaced portion of the frame, a spring suspension between said assembly and the frame pivotally connected to the frame so that said assembly may have pivotal movement relative to said frame about a lateral axis substantially parallel to said axles, means independently of said spring suspension interconnecting said axles and said frame for transmitting brake and drive torque reactions to the frame and stabilizing said tandem axle assembly longitudinally of the vehicle, and means structurally distinct from said suspension and said longitudinal stabilizing means connected between said tandem drive axle assembly and said frame for laterally stabilizing said tandem axle assembly during its relative movement with respect to said frame, said lateral stabilizing means comprising an equalizing lever intermediately pivoted about an axis normal to the axle axis on each drive axle, generally transverse rods connecting the opposite ends of said lever to opposite sides of the frame and universal connections between the rod ends and the lever and frame respectively, said suspension and longitudinal and lateral stabilizing means cooperating to provide a vehicle having optimum flexibility and improved drive torque.

2. The combination defined in claim 1 wherein said longitudinal stabilizing means comprises, spaced transversely aligned pairs of torque rods extending longitudinally of the vehicle frame, the adjacent ends of said pairs being pivotally mounted relative to said frame intermediate said axles and the opposite ends of the torque rods of each of said pairs being pivotally connected respectively to the forward and rearward ones of said drive axles.

3. The combination defined in claim 1 wherein said spring suspension comprises a plurality of leaf springs extending longitudinally of said frame between said drive axles; said springs being flexibly connected to said drive axles at their ends and pivotally connected intermediate the ends of said spring to said frame.

4. A tandem drive axle assembly for motor vehicles having a frame, comprising spaced axle housings having enlarged differential mechanism receiving portions provided with openings, differential mechanism and differentially driven axle shafts in said housings, road wheels journalled on the outer ends of each housing and drivingly connected with the respective axle shafts, a differential mechanism carrier demountably secured to the differential receiving portion of each axle housing over the associated opening, said carrier projecting from said housing and having an opening, a separate power transfer gear reduction unit for each differential mechanism carrier comprising a casing, a wall on said casing interfitting with said nose and serving as an adapter for demountably supporting each unit upon the respective gear carrier, each of said units including a power input shaft and a pinion shaft driven from the input shaft and connected to drive the associated differential, a propeller shaft drivingly connecting said input shafts, a suspension connecting the axle housings with each other and mounting the assembly on said vehicle frame and maintaining said axles in longitudinal spaced relation, and means between each axle and said frame for laterally stabilizing said assembly comprising an equalizing lever pivoted intermediate its ends upon an axis normal to the axle axis on each drive axle housing, generally transverse rods connecting the opposite ends of said lever to opposite sides of the frame and universal connections between the rod ends and the lever and frame respectively.

LAWRENCE R. BUCKENDALE.

REFERENCES CITED

The following references are of record in the file of this patent:

UNITED STATES PATENTS

| Number | Name | Date |
|---|---|---|
| 1,605,065 | Rackham | Nov. 2, 1926 |
| 2,064,262 | Keese | Dec. 15, 1936 |
| 2,144,359 | Bryan | Jan. 17, 1939 |
| 2,206,752 | Price | July 2, 1940 |
| 2,290,620 | Brown | July 21, 1942 |
| 2,291,174 | Stewart | July 28, 1942 |
| 2,306,856 | Ash | Dec. 29, 1942 |
| 2,309,162 | Buckendale | Jan. 26, 1943 |
| 2,347,987 | Brumbaugh | May 2, 1944 |
| 2,356,180 | Roos | Aug. 22, 1944 |
| 2,381,624 | Simonds | Aug. 7, 1945 |
| 2,386,917 | Thornton | Oct. 16, 1945 |
| 2,389,339 | Ash | Nov. 20, 1945 |
| 2,477,925 | Gentry | Aug. 2, 1949 |

FOREIGN PATENTS

| Number | Country | Date |
|---|---|---|
| 301,584 | Great Britain | Dec. 6, 1928 |
| 389,900 | Great Britain | Mar. 30, 1933 |